United States Patent [19]
Adam et al.

[11] Patent Number: 5,094,208
[45] Date of Patent: Mar. 10, 1992

[54] FUEL CONTROL SYSTEM

[75] Inventors: Klaus Adam, Asperg; Heinz Böhmler, Pleidelsheim, both of Fed. Rep. of Germany

[73] Assignee: Robert Bosch GmbH, Stuttgart, Fed. Rep. of Germany

[21] Appl. No.: 573,197

[22] PCT Filed: Dec. 10, 1988

[86] PCT No.: PCT/EP88/01137
§ 371 Date: Aug. 10, 1990
§ 102(e) Date: Aug. 10, 1990

[87] PCT Pub. No.: WO90/06427
PCT Pub. Date: Jun. 14, 1990

[51] Int. Cl.$^5$ .............. F02D 19/08; F02B 1/02; F02P 5/145
[52] U.S. Cl. .............. 123/406; 123/1 A; 123/489
[58] Field of Search .............. 123/1 A, 440, 489, 575, 123/416, 417, 406

[56] References Cited

U.S. PATENT DOCUMENTS

| | | | |
|---|---|---|---|
| 4,440,131 | 4/1984 | Felger et al. | 123/440 |
| 4,481,908 | 11/1984 | Iida | 123/1 A |
| 4,495,930 | 1/1985 | Nakajima | 123/575 |
| 4,546,732 | 10/1985 | Mae et al. | 123/1 A |
| 4,584,982 | 4/1986 | Clement et al. | 123/489 |
| 4,594,968 | 6/1986 | Degobert et al. | 123/1 A |
| 4,993,386 | 2/1991 | Ozasa et al. | 123/1 A X |

FOREIGN PATENT DOCUMENTS

| | | |
|---|---|---|
| 2544444 | 4/1977 | Fed. Rep. of Germany. |
| 96743 | 5/1987 | Japan ............ 123/1 A |

*Primary Examiner*—Tony M. Argenbright
*Attorney, Agent, or Firm*—Walter Ottesen

[57] ABSTRACT

An internal combustion engine 30 capable of operating on petrol an/or methanol has an adaptive control system responsive to a lambda-sensor (23), a limiter device (21) and a multiplier device (22) which, in response to the richness of the air/fuel mixture, produce a signal (FMCOR) for influencing the fuel injection times ($t_i$).

16 Claims, 1 Drawing Sheet

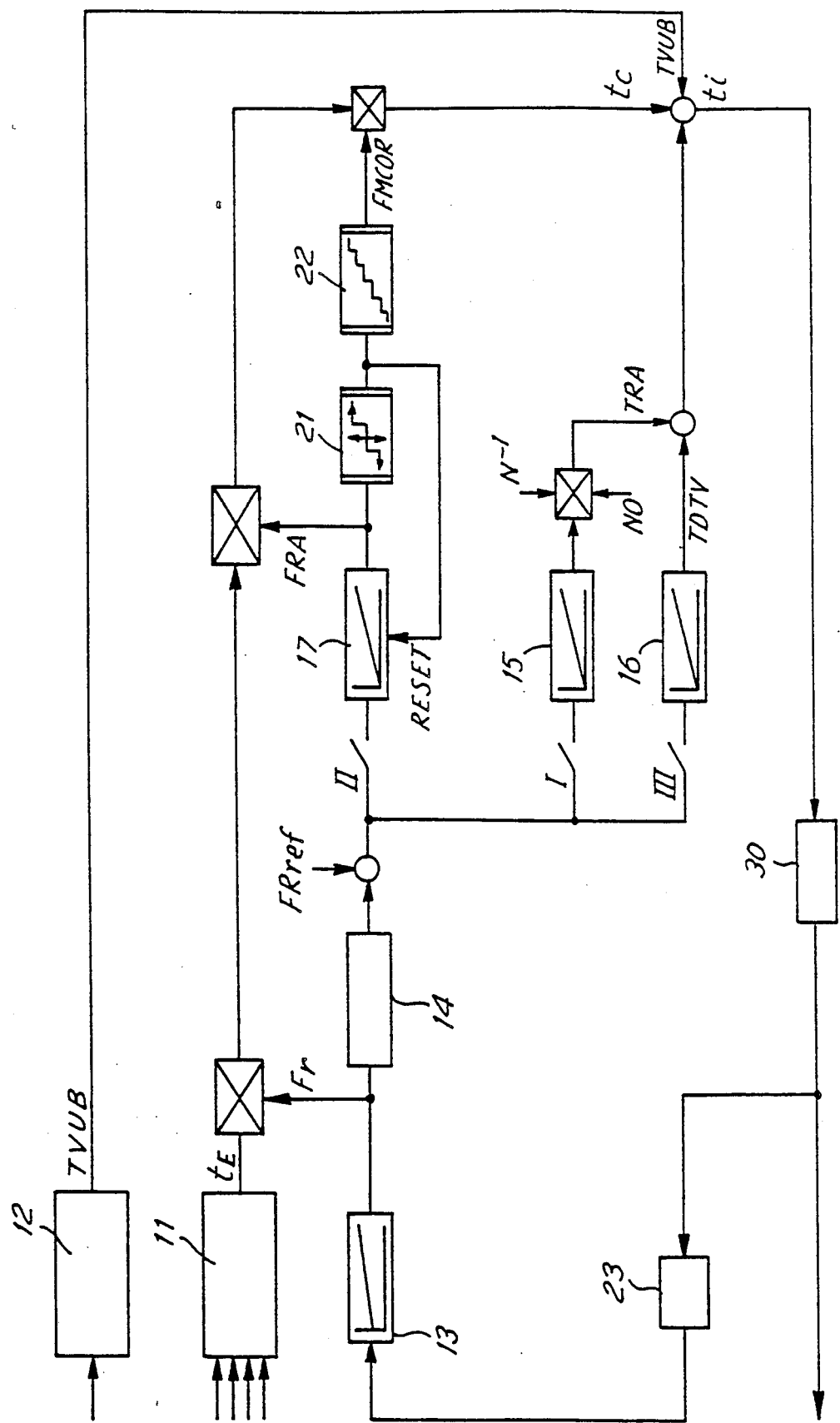

FUEL CONTROL SYSTEM

FIELD OF THE INVENTION

The present invention relates to an arrangement for and a method of detecting the amount of one constituent in a mixture of fuel constituents.

BACKGROUND OF THE INVENTION

The number of internal combustion engines is growing in which alternative fuels or a mixture of fuels can be used. The advantages of such arrangements are discussed, for example, in DE-A-2544444 and U.S. Pat. No. 4,495,930.

In DE-A-2544444 use is made of the fact that an alcohol/petrol mixture has an electrical conductivity which varies in dependence on the ratio of the constituents. The fuel/air ratio required for optimal operation also varies with the fuel constituents and so the opening time of the fuel supply means is varied in dependence on the conductivity measurement. A disadvantage of this arrangement is that an extra component i.e. a sensor is required to measure the conductivity; this adds weight and expense.

SUMMARY OF THE INVENTION

The present invention seeks to provide an improved solution.

According to a first aspect of the present invention there is provided an internal combustion engine capable of operating on first and second kinds of fuel or a mixture thereof characterised in that there is provided sensor means for producing a signal representative of the richness of the air/fuel mixture, and means for processing said signal to influence an operating parameter of the engine.

The sensor means is preferably a lambda-probe such as an oxygen sensor in the exhaust of a vehicle engine, and the fuels are methanol and petrol.

An advantage of this arrangement is that the sensor means is already present and the added expense, weight and size of a dedicated methanol sensor are avoided.

In a preferred arrangement the processing means produces a feedback signal in a loop to provide an adaptive system for controlling the air/fuel supply ratio, that is by controlling the fuel injection times.

The vehicle may be arranged to operate on pure petrol or pure methanol or a mixture of the two.

According to a second aspect of the invention there is provided a method of determining the amount of one fuel in a mixture in an internal combustion engine characterised in that said amount is determined from a value representative of the richness of the fuel mixture.

The present invention is based on the recognition that the control deviation of a lambda-sensor becomes greater as the methanol fraction in the supplied fuel mixture increases. The lambda probe output signal is preferably detected and processed by an engine management system or electronic control unit with adaptive lambda control, that is a MOTRONIC-control device. The methanol content is calculated from the control deviation and stored in a permanently powered random access memory. Thus after switching off the engine and subsequently starting it again, the stored methanol content value is immediately available.

BRIEF DESCRIPTION OF THE DRAWING

A preferred embodiment of the present invention will now be described, by way of example only, with reference to the accompanying drawing which shows a lambda closed loop control circuit with pilot controls.

DESCRIPTION OF THE PREFERRED EMBODIMENTS OF THE INVENTION

A MOTRONIC control circuit comprises a plurality of functional blocks 11 to 17. Block 11 calculates a fuel injection time $t_E$ which is the product of engine load $t_L$ and a correction factor Fges which takes into account warm-up, post-start enrichment, intake air temperature correction, acceleration enrichment and the factor from the lambda-map. Thus block 11 receives as inputs signals representative of engine speed, engine load, engine temperature and air temperature.

Block 12 produces a time correction factor to compensate for the fact that the time required for the injection valve to open and to close fully is dependent on the voltage supply. Thus block 12 receives at its input a battery voltage signal.

The lambda closed loop control comprises a lambda-sensor 23, that is, an oxygen sensor, and a PI-controller, block 13, with proportional and integral terms and producing an output factor Fr.

The adaptive pilot control for the lambda closed loop control comprises blocks 14 to 17. Block 14 is a long time low-pass-filter providing an output representing average fuel richness.

I, II and III are the selected ranges for the adaptive pilot control. Block 15 is the adaptive correction for air which is not measured, caused by leakage in the intake manifold. It is used to produce a parameter TRA which is stored in the CMOS RAM in which the acquired information is held until the control device or the battery is disconnected. N is the engine speed and NO is a reference engine speed value, for example, 2000 rpm.

Block 16 is the adaptive correction for the injection valve and produces an output TDTV which is also stored in the RAM. Block 17 is an integrator for the adaptive correction for the altitude error and for the correction for the fuel quality, and provides an output FRA, which is also stored in the RAM. A hot wire air mass meter or other device for measuring air mass with respect to time may be used to eliminate any altitude error. As described so far, the arrangement corresponds to the existing MOTRONIC control as shown, for example, in FIG. 3 of U.S. Pat. No. 4,440,131.

In the present arrangement, further blocks 21, 22 are provided which constitute a flexible fuel adaptation and are an extension of FRA integrator 17. The range of the output of integrator 17 with petrol alone is 0.8 to 1.2. With flexible fuel, that is, the petrol/methanol alternative a range of 0.8 to 2.0 is required. Block 21 limits integrator 17. If FRA reaches the upper limit, block 22 multiplies FMCOR by the value of FRA and FRA is then reset. So if the maximum is reached, FRA is reset to 1 and FMCOR new is equal to 1.2 times FMCOR old. A corresponding procedure is performed at the lower limits of FRA. FMCOR is also stored in the RAM.

In normal operation, for example, without any air leakage or altitude error, the pilot control is adjusted to the stoichiometric air/fuel ratio. The process for achieving this ratio upon a change of fuel is exemplified below.

If at any time there is a step-transition from pure petrol to pure methanol the reset procedure occurs three times in succession. After that the theoretical value of FMCOR is 1.728 (=1.2³) but FMCOR is limited to 2. The remaining control deviation is corrected by FRA. (In this example: FRA=1.157). Changing from pure methanol to pure petrol, the corresponding procedure is performed downwards (FMCOR 1). In both cases FRA can be used for corrections in a range about ±20%, when FMCOR has been adapted.

Then the amount of methanol is calculated by the relation

Methanol content (in percent)=100*(FMCOR*FRA−1).

This value is used for the appropriate selection of spark timing and for the selection of different control parameters of the lambda closed loop control which may be affected by a variable methanol content in the fuel mixture.

Blocks 21, 22 may be provided as an optional module so that lambda-closed loop control alone may be provided or may be combined with the flexible fuel module. Alternatively the described arrangement can be realized by a different FRA-gauge, i.e. an extended range of the FRA-integrator 17 so there is no need for an additional factor FMCOR. With this alternative, an existing algorithm for lambda-closed-loop-control is affected by different changes. Thus the described embodiment has the additional factor FMCOR as a modular extension of existing and approved softwater.

The corrected fuel injection time signal $t_e$ modified by outputs TRA, TDTV and TVUB, is supplied as an actual signal $t_i$ to engine 30.

The RAM is a part of the control unit and the engine CPU uses it as a non volatile memory, so power must always be supplied. The RAM is supplied with information during operation of the vehicle dependent upon the different influences as outlined above. After the engine is switched off and is subsequently started again, the adaptive methanol content is immediately available.

An arrangement in accordance with the present invention can be used in a fuel supply system in which there are separate tanks for the different fuels, for example, as discussed in U.S. Pat. No. 4,495,930 in which the ratio between the two kinds of fuel is varied in response to engine load. The deduction of methanol content from the richness of the air/fuel mixture can be used in a feedback loop to check that the correct amount of methanol is being supplied to the engine. Means may be connected to blocks 21, 22 for actually measuring and- /or indicating the proportion of methanol in the fuel.

We claim:

1. An internal combustion engine capable of operating on different kinds of fuel, the engine comprising:
sensor means for producing a signal representative of the richness of the air/fuel mixture;
processing means for processing said signal to influence an operating parameter of the engine; and,
said processing means includes a limiter device and a multiplier device.

2. The engine of claim 1, comprising: a loop for providing an adaptive system for controlling the air/fuel supply ratio; and, said processing means producing a feedback signal (FMCOR) in said loop.

3. The engine of claim 2, wherein said processing means controls the fuel injection times of the engine.

4. The engine of claim 1, wherein the fuel has a methanol content, the engine further comprising: means for calculating the methanol content of the fuel; and, means for controlling the spark timing in dependence on the calculated methanol content.

5. The engine of claim 1, wherein said sensor means includes a lambda probe arranged in the exhaust of the engine.

6. The engine of claim 1, wherein the different kinds of fuel include a fuel selected from methanol, petrol and a mixture of methanol and petrol.

7. The engine of claim 1, wherein said limiter device and the multiplier device are connected to the output of an integrator for adaptive correction.

8. The engine of claim 7, wherein the output of the limiter device is fed back to said integrator for resetting said integrator.

9. A control arrangement for an internal combustion engine capable of operating on different kinds of fuel, the control arrangement comprising:
sensor means for producing a signal representative of the richness of the air/fuel mixture;
processing means for processing said signal to influence an operating parameter of the engine; and,
said processing means including limiter means and multiplier means.

10. The control arrangement of claim 9, wherein the different kinds of fuel include a fuel selected from methanol, petrol and a mixture of methanol and petrol.

11. The control arrangement of claim 9, further comprising: a loop for providing an adaptive system for controlling the air/fuel supply ratio; and, said processing means producing a feedback signal (FMCOR) in said loop.

12. The control arrangement of claim 11, wherein said processing means controls the fuel injection times of the engine.

13. The control arrangement of claim 11, further comprising: means for calculating the methanol content of the fuel; and, means for controlling the spark timing in dependence on the calculated methanol content.

14. The control arrangement of claim 9, wherein said sensor means includes a lambda probe arranged in the exhaust of the engine.

15. The control arrangement of claim 9, wherein said limiter means and said multiplier means are connected to the output of an integrator for adaptive correction.

16. The control arrangement of claim 15, wherein the output of said limiter means is fed back to said integrator for resetting said integrator.

* * * * *

UNITED STATES PATENT AND TRADEMARK OFFICE
CERTIFICATE OF CORRECTION

PATENT NO. : 5,094,208

DATED : March 10, 1992

INVENTOR(S) : Klaus Adam and Heinz Böhmler

It is certified that error appears in the above-identified patent and that said Letters Patent is hereby corrected as shown below:

On the title page, in the Abstract, line 2: delete "an/or" and substitute -- and/or -- therefor.

In column 3, line 33: delete "softwater" and substitute -- software -- therefor.

Signed and Sealed this

Eighth Day of June, 1993

Attest:

MICHAEL K. KIRK

Attesting Officer

Acting Commissioner of Patents and Trademarks